United States Patent

[11] 3,626,470

| [72] | Inventors | Harold J. Antonides<br>Kankakee;<br>M. Budd Mittleman, Chicago, both of Ill. |
|---|---|---|
| [21] | Appl. No. | 853,677 |
| [22] | Filed | Aug. 28, 1969 |
| [45] | Patented | Dec. 7, 1971 |
| [73] | Assignee | Armour Pharmaceutical Company<br>Chicago, Ill. |

[54] DIAGNOSTIC DEVICE FOR OBTAINING CYTOLOGIC SAMPLES
10 Claims, 4 Drawing Figs.

[52] U.S. Cl. ............................................. 128/2 R,
128/269, 128/296, 195/139
[51] Int. Cl. ................................................... A61b 10/00
[50] Field of Search .......................................... 128/2, 2 B,
263, 296, 290, 269; 195/2, 7, 139

[56] References Cited
UNITED STATES PATENTS

| 2,847,000 | 8/1958 | Nieburgs | 128/2 |
|---|---|---|---|
| 3,086,527 | 4/1963 | Forrest | 128/263 |
| 3,278,390 | 10/1966 | Arthur | 195/2 |
| 3,308,039 | 3/1967 | Nelson | 195/139 X |
| 3,324,855 | 6/1967 | Heimlich | 128/296 X |
| 3,351,060 | 11/1967 | De Woskin | 128/263 |
| 3,368,549 | 2/1968 | Barr et al. | 128/2 |
| 3,386,441 | 6/1968 | De Merre | 128/290 X |
| 3,450,129 | 6/1969 | Avery et al. | 128/2 |
| 3,512,518 | 5/1970 | Mishkin et al. | 128/2 |
| Re. 21,943 | 11/1941 | Munro | 128/271 |
| 2,902,146 | 9/1959 | Doherty | 206/63.3 |
| 2,987,063 | 6/1961 | Glickston | 128/269 |
| 3,017,879 | 1/1962 | Sapit et al. | 128/2 |
| 3,262,450 | 7/1966 | Elias | 128/270 |
| 3,343,540 | 9/1967 | Siegel | 128/269 |

FOREIGN PATENTS

| 1,114,208 | 5/1968 | Great Britain | |

OTHER REFERENCES

Rocha & Silva, Compt. Rend. Soc. Biol., 33 Chem. Abst. 3461

Rocha & Silva, Arch. Exptl. Path. Pharmakol., 35 Chem. Abst. 2972

*Primary Examiner*—Richard A. Gaudet
*Assistant Examiner*—Kyle L. Howell
*Attorneys*—Carl C. Batz and Richard R. Mybeck

ABSTRACT: A diagnostic device for obtaining cytologic samples such as in collecting cervical and endocervical cell specimens for Papanicolaou smear testing and the like, is described. The device comprises an elongated handle carrying a flexibly coupled platform member upon which a spongelike pledget is uniquely formed, the latter being impregnated with a critical amount of a proteolytic enzyme. The characteristic properties of the proteolytic enzyme facilitate cellular defoliation and sampling, and improved diagnostic examination of the cells so collected by inducing lysis of the obscuring mucus which occurs at or near the cervical site.

PATENTED DEC 7 1971
3,626,470
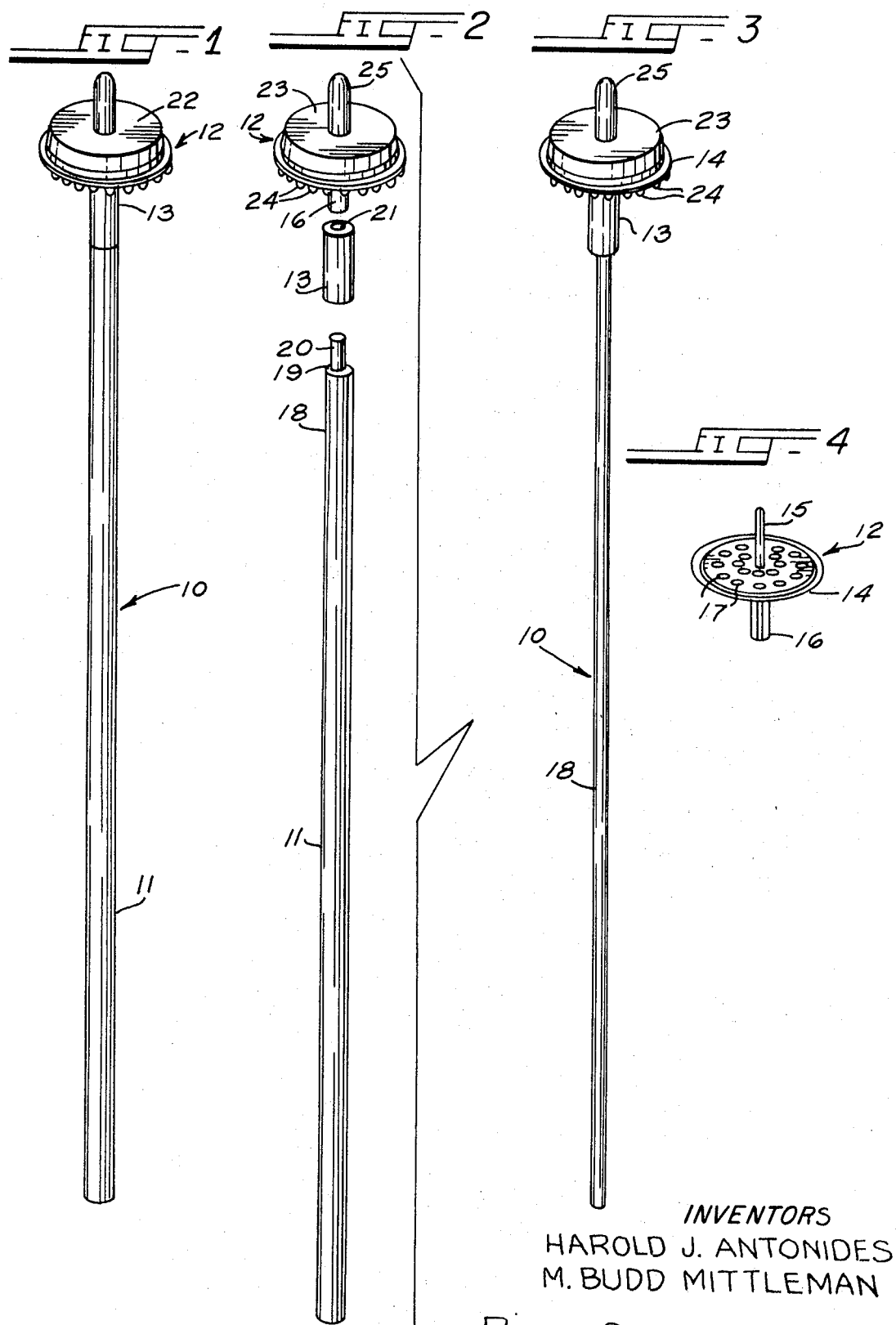
INVENTORS
HAROLD J. ANTONIDES
M. BUDD MITTLEMAN
BY Richard R Mybeck
Carl C. Batz  ATTYS.

DIAGNOSTIC DEVICE FOR OBTAINING CYTOLOGIC SAMPLES

DESCRIPTION OF INVENTION

This invention relates generally to a diagnostic device and more particularly to a device for use with gynecologic procedures such as the Papanicolaou smear test where samples of body secretions, especially form the cervix and endocervix or vagina, are obtained and examined to detect cancer or evaluate the hormonal status of the patient.

The techniques currently used by the practicing gynecologist to obtain such samples are the "scope," the "wipe" and the "aspiration" techniques and each require expertise if accurate readings are to be obtained.

The scrape technique is practiced by running the edge of a tongue depressor or other flat instrument around the cervix to obtain a specimen which is thereafter transferred, while moist, to a slide, then fixed and stained.

The wipe technique, which may be used to obtain a cervical smear as well as cellular samples from the posterior fornix, is practiced by traversing with a cotton swab the area from which a sample is desired and thereafter transferring the specimen, while moist, to a slide where it is fixed and stained.

The aspiration technique is practiced with an elongated pipette and a suction bulb which is inserted into the cervical os to collect the cell-bearing mucus within the endocervical canal.

In all of these techniques, mucus is obtained with the specimen and causes an obscuration of the sample which interferes with the accurate visual analysis of the specimen by the examining cytologist.

All of the techniques suffer from the need to have highly skilled personnel available to collect the sample, since accurate cytologic diagnosis is heavily dependent upon qualitatively and quantitatively adequate cellular samples collected from the correct sites.

It should be understood that a real diagnostic danger exists when the cytologist reports a false negative, that is, reports the specimen to be free of aberrant or malignant cells when in fact such cells are actually present but are not detected. This false negative diagnosis may result when poor sampling technique fails to collect the cells or when such cells are collected but not readable, either because they are obscured by the mucus secretions obtained concomitantly therewith, or because they cannot be adequately stained and accurately read.

Accordingly, the need exists for a diagnostic device which can readily obtain without special expertise cytologic samples, for example of cervical and endocervical origin. Such a device should also obviate the possibility of sample obscuration resulting from the mucus secretions characteristic of the area being examined, and additionally, be quantitatively maximizing the cellular samples collected from critical sites thereby obtain a complete and accurate specimen, whereupon the incidence of false negatives from the execution of the cytologic diagnosis is substantially minimized.

The present invention is predicated upon our discovery of a novel device for such diagnostic use which fulfills all of the aforestated needs and is characterized, inter alia, by the presence of dehydrated proteolytic enzyme strategically dispersed through a specially prepared foamed pledget which is integrally and uniquely formed into the device, and which, in use, obtains great success in procuring cellular specimens as from the external cervix and the cervical os, which specimens are readily diagnosable by visual techniques and are relatively free from the excess mucous which may interfere with or otherwise reduce the accuracy of such techniques.

Accordingly, a prime object of the present invention is to provide a diagnostic device for cytologic sampling as in gynecologic use to obtain a specimen from the external cervix and the endocervical canal, which specimen is rendered relatively free from visual interference from mucus and is thereby uniquely available for accurate microscopic examination.

Another object of the present invention is to provide a diagnostic device for obtaining cytologic samples, for example, samples of cervical and endocervical origin, which is easily manufactured and packaged, readily available for use, and may be conveniently employed to obtain desired specimens and to transfer such specimens to a microscope slide for fixing, staining and subsequent examination.

A further object of the present invention is to provide a device for cytologic sampling as for use by gynecologists, which contains, impregnated in the pledget portion thereof, a proteolytic enzyme material which acts upon mucus found at the sites of cellular sampling, which mucus would otherwise reduce the clarity of the cellular sample and thereby interfere with or otherwise impair the accuracy of the cytologic diagnosis thereof.

Another object of the present invention is to provide a device for use in cytologic sampling, as in gynecologic practice, which does not require great skill to use in obtaining meaningful specimens because it is essentially self-positioning.

Still another object of the present invention is to provide a device for use in cytologic sampling, as exemplified by the Papanicolaou smear test, which device contains an enzyme impregnated therewithin which enhances quantitatively the cellular sample collected, and which confers qualitative improvement on the resultant smear by significantly thinning the mucus secretions and thereby improving the stainability and cytologic readability of the cellular sample.

These and still further objects as shall hereinafter appear are fulfilled by the present invention in a remarkably unexpected fashion as will be readily discerned from the following detailed description of certain exemplary embodiments of this invention, especially when read in conjunction with the accompanying drawings in which:

FIG. 1 is an isometric showing of a pledget constructed according to the present invention;

FIG. 2 is an exploded view of the device in FIG. 1 showing its assembly;

FIG. 3 is an isometric view of an alternate embodiment of the present invention; and FIG. 4 is an isolated view of the pledget base formed in accordance with the present invention.

Referring now to the drawings in which the device of our invention is indicated by the general reference 10, each device comprises an elongated handle portion 11 and a platform portion 12 interconnected by a coupling member 13. The platform portion, shown clearly in FIG. 4, comprises a foraminous circular plate 14 having an elongated stem 15 extending upwardly therefrom and a second stem 16 extending downwardly therefrom. Stems 15 and 16 both extend generally normal to plate 14. The foraminae 17 of plate 14 are disposed randomly or concentrically within plate 14 for purposes which shall be hereinafter described.

Handle member 11, as shown in FIGS. 1 and 2, comprises an elongated body portion 18 having annular ledge 19 defined on one end thereof in circumscription of axially extending stem 20. Stem 20 is provided with a lesser diameter than body portion 18 and is adapted to telescopically engage within a passageway 21 defined through coupling member 13.

To assemble handle portion 11 and platform portion 12, stem 20 is inserted into the lower end of passageway 21 and stem 16 of platform portion member 12 is inserted into the upper end of the passageway 21.

Coupling member 13 is preferably formed of a resilient material such as polyethylene plastic, rubber or like material which is capable of holding stems 16, 20 in frictional engagement while providing flexibility to the device 10.

On the upper surface of platform portion 12 is disposed, in a manner to be more fully explained below, a pledget 22 having a circular body portion 23 which lays upon disc member 14 in surface-to-surface engagement therewith and forms a plurality of beads 24 which extend through foraminae 17 to retain pledget 22 in its operative position. Pledget 22 further comprises an upwardly extending nose portion 25 which surrounds stem 15 and is integrally formed with body portion 23.

In the alternate embodiment illustrated in FIG. 3, handle member 18 is provided throughout its length with a diameter corresponding to opening 21 in coupling member 13.

To manufacture the device as described in an easy and economical fashion, we have found that plastic molding is well suited to the manufacture of both the handle member 11 as well as the platform members 12. Alternatively, handle member 18 may be also formed of coated paper, plastic or metal.

The coupling members 13 are readily obtained by conventional molding techniques or, simply, by cutting segments of suitable length from commercially available rubber or plastic tubing. Alternatively, the coupling member 13 may be formed with a male projection thereon adapted for insertion within corresponding female openings defined in stems 16, 20. Other known linkages may also be used to flexibly couple handle 18 to member 12 without departing from the spirit of this invention.

To form pledget 22 upon the platform to obtain the desired retention, several materials have been found to be satisfactory, such for example, as silicone rubber, the polyurethanes, the polyether urethanes and the like. In finished form, the pledget will be porous, flexible and compressible and will have a network distributed at random therein.

One highly satisfactory foam material for use in this invention is obtainable from Dow Corning of Midland, Michigan, under the trade name SILASTIC S-5370 RTV. The material, described in Dow Bulletin 08-102 of Aug., 1964, contains a mixture of dimethyl polysiloxane fluid polymers and inert diatomaceous earth fillers. The polymers are made up of long linear polymer chains of alternating silicon and oxygen atoms with two methyl groups attached to most silicon atoms. The dimethyl polysiloxane structure is:

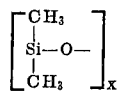

$$\left[ \begin{array}{c} CH_3 \\ | \\ Si-O- \\ | \\ CH_3 \end{array} \right]_x$$

The molecular weight and viscosity of the polymer increases as the average value of $X$ increases. The material is converted to an elastomer upon reaction with stannous octoate which evolves a gas during vulcanization to create the foam elastomer with an expansion ratio of approximately 6.

In a random sample of 27 pledgets formed from foamed silicone rubber, 117 pore diameter measurements made therefrom with an optical micrometer under 40X magnification ranged from 130 to 546 microns, the mean and standard deviation being 336.2 ±98.5 microns. The 95 percent confidence interval of the means was ±18.0 microns. An analysis of the same sample for apparent specific gravity provided a range of from 0.177 to 0.292, with a mean value of 0.223 ±0.028 standard deviation.

To secure the foam pledget 22 to plate 14, the support member 12 is inserted into a mold while the foam is generated. The passage of foam through foraminae 17 occurs to form beads 24 and when the foam is set, the beads 24 secure pledget 22 to plate 14. The expansion of the foam, using the technique described, envelopes the exposed surface of stem 15. The thickness of the pledget 22, including nose portion 25 is obtained by defining appropriate clearances in the cavity between the member 12 and the mold.

To introduce our enzyme solution into the foam pledget, a vacuum impregnation technique has been developed which obtains highly satisfactory results, that is, the enzyme is well dispersed in the pledget and the amount available for reconstitution upon contact with body fluid is substantially controllable and ascertainable.

While the pliable foams, e.g., silicone rubber, polyurethane foam and the like, are not readily impregnated with aqueous systems until all gaseous matter, including air, is dispelled from the foam, we find that by immersing the foam in a solution and mechanically compressing the foam to exclude the air therefrom, the aqueous solution will then enter the cells of the foam previously occupied by air. This technique, while useful for the production of prototypes is too cumbersome for commercial production.

Thus, we prefer that the pledget to be impregnated be submerged into an aqueous solution and held beneath the surface while a vacuum is drawn to reduce the pressure within the vessel. The vacuum causes the air entrapped within the cells to expand and to migrate to the exterior of the foam where it forms bubbles which rise to the surface of the solution. The vacuum is maintained until the desired amount of air is removed.

The vacuum removal of air from the foam allows the solution in which the pledget is immersed to enter the foam as the vacuum is relieved and the pressure within the vessel returns to atmospheric. A correlation was found to exist between the amount of solution absorbed into the foam and the degree of vacuum provided over the solution. Further, the incorporation of 1 percent polysorbate 80 was found to further increase the water absorbability of the foam.

Following the absorption of the aqueous solution by the foam, the saturated foam may be frozen and vacuum dried. The freeze drying will leave the enzyme solute as a residue dispersed throughout the foam.

The amount of proteolytic enzyme to be dispersed in each pledget is readily determined by the fibrin plate assay hereinafter described in example I. In its preferred form, the pledget will contain a concentration of proteolytic enzyme dispersed therewithin which is at least capable of producing a zone of lysis of not less than 1.0 mm. in not more than 20 minutes and not less than 5.0 mm. in not more than 60 minutes.

Preferred choice among proteolytic enzymes available are trypsin, chymotrypsin and mixtures thereof although other proteases, such as, bromelain, papain, ficin, pepsin and plasmin may also be employed when economics permit.

Another variation which can be obtained without departing from the spirit hereof includes the formation of the pledget from a cellulosic material whereupon the desired self-positioning and combined mechanical and enzymatic debridement and cellular defoliation may still be realized even when the cellulose is molded to combine the platform member therewithin.

Furthermore, the need for cytologic sampling of body orifices other than the cervical os, such as, for instance, the rectum, should readily suggest alternative shapes and sizes for the enzyme-containing pledget and are considered to be within the scope of this disclosure.

To further aid in the understanding of the present invention, and not as a limitation thereupon, the following examples are presented.

EXAMPLE I

A fibrin plate assay was constructed to determine the relative proteolytic activity of trypsin, chymotrypsin, and a mixture of chymotrypsin and trypsin (approx. 1:5 ). The assay provided data relating time to the extent of fibrin lysis, and therefore provided a measure of proteolytic activity.

One hundred milliliters of solution was prepared having the following composition:

| | |
|---|---|
| Bovine Fibrinogen Power | 1% (w./v.) |
| Gelatin | 2% (w./v.) |
| Thrombin | 1 unit |
| Methyl Paraben | 0.2% (w./v.) |
| Propyl Paraben | 0.02% (w./v.) |
| Isotonic Sodium Chloride Soln. | q.s |

The test enzymes were reconstituted in distilled water to provide a solution. The label potency of the various enzyme materials from which the test solutions were prepared are:

| Sample No. | Enzyme Material | Potency/mg. |
|---|---|---|
| 1 | Trypsin N.F. | 3280 N.F.U. |
| 2 | Chymotrypsin N.F. | 1,055 N.F.U. |
| 3 | Mixture (C:T::approx.1:5*) | 600 A.U. |

*Designated also as Pancreatic Enzyme Concentrate

Petri dishes ($d$=100 mm., $h$=15 mm.) were prepared by individually pipetting 10 ml. of the thoroughly blended Fibrin solution onto each dish and allowing the dishes to stand on a level surface for 1.5 to 2 hours at room temperature. The dishes are then ready to be used or, if not convenient, may be stored upright at 5–10° C. until use is desired. When the dishes are refrigerated, it is desirable to remove the dishes from the refrigerator and place them on a level surface at room temperature for about 60 minutes before use.

To conduct the fibrinolysis test, a clean, dry filter paper disc such as is commonly used for microbiological testing is moistened with water to determine how much solution would be needed to thoroughly wet the disc without overwetting it. When this amount of solution is known, various test solutions are prepared containing in that amount of water the various measured quantities of test enzyme. Each paper disc is then laid on a clear flat dry glass surface and the measured enzyme solution is applied thereto. The saturated discs are then transferred, as with a tweezers, to a position on the fibrin layer formed in the Petri dish as described, which is resting, at room temperature, on a level surface.

The fibrinolytic action of the enzyme is then recorded in two way, viz, first, by timing the lytic process until a 1:00 mm. zone of lysis is produced (See table I); and second, by measuring with a vernier caliper the zone of lysis produced at 10, 20, 30, 40, 50 and 60 minutes (See table II).

In both tables, to eliminate the constant of the disc diameter in determining the zone of lysis values for comparative purposes, the following formula was used:

$$\frac{\text{Diameter of Zone of Lysis in mm.} - 6 \text{ mm.}}{2} = \text{Zone of Lysis}$$

From the data it is demonstrated that a proteolytic enzyme to be suitable for use herein, must be of a potency to produce in the described fibrin plate assay, a zone of lysis of not less than 1.0 mm. in not more than 20 minutes.

The benefit of the invention may be obtained when the enzyme chosen provides a zone of lysis of not less than 5.0 mm. in not more than 60 minutes.

From a purely economic view, it is apparent that the mixture designated "Pancreatic Enzyme Concentrate" is the most practical for it obtains the desired effect at a significantly lower potency and the cost of enzyme is directly proportional to quantity (i.e., potency) required. All proteolytic enzymes will by definition obtain lysis of the fibrin plate but some will do so only at an uneconomic potency level.

TABLE I

| Number: | Potency (units)[2] | Comparative rates in minutes to produce 1 mm. of fibrin lysis[1] | | |
|---|---|---|---|---|
| | | Pancreatic enzyme concentrate[3] | Chymotrypsin | Trypsin |
| A | 100 | 50 | 60 | 77 |
| B | 500 | 18 | 48 | 50 |
| C | 1,000 | 15 | 28 | 36 |
| D | 1,500 | 14 | 23 | 35 |
| E | 2,500 | 13 | 22 | 34 |
| F | 5,000 | 6 | 18 | 32 |

[1] Film of fibrin 1% and gelatin 2% in isotonic saline.
[2] Pancreatic enzyme concentrate measured by Armour Units (A.U.). Chymotrypsin and Trypsin measured by National Formulary Units (N.F.U.).
[3] Chymotrypsin:Trypsin, approximately 1:5.

TABLE II.—COMPARATIVE RATES OF FIBRIN LYSIS

| Potency (u.) | Zone of lysis in millimeters at— | | | | | |
|---|---|---|---|---|---|---|
| | 100 | 500 | 1,000 | 1,500 | 2,500 | 5,000 |
| Pancreatic enzyme concentrate:[2] | | | | | | |
| 10 min | 0 | 0 | .5 | .75 | 1 | 2 |
| 20 min | 0 | 1 | 1.25 | 1.5 | 1.5 | 2.75 |
| 30 min | 0 | 1.5 | 2 | 2.25 | 2.5 | 3.75 |
| 40 min | 0 | 1.75 | 2.25 | 2.75 | 3 | 4.25 |
| 50 min | 1 | 2 | 2.5 | 3.25 | 3.5 | 4.75 |
| 60 min | 1.5 | 2.25 | 2.75 | 3.5 | 4 | 5.25 |
| Chymotrypsin:[3] | | | | | | |
| 10 min | 0 | 0 | 0 | 0 | 0 | 0 |
| 20 min | 0 | 0 | 0 | 0 | 0 | 1.25 |
| 30 min | 0 | 0 | 1 | 1.25 | 1.25 | 1.5 |
| 40 min | 0 | 0 | 1 | 1.5 | 1.5 | 2 |
| 50 min | 0 | 0 | 1 | 1.5 | 1.75 | 2.25 |
| 60 min | 1 | 1.5 | 1.5 | 1.75 | 2 | 2.25 |
| Trypsin:[4] | | | | | | |
| 10 min | 0 | 0 | 0 | 0 | 0 | 0 |
| 20 min | 0 | 0 | 0 | 0 | 0 | 0 |
| 30 min | 0 | 0 | 0 | 0 | 0 | .75 |
| 40 min | 0 | 0 | 1.25 | 1.25 | 1.25 | 1.5 |
| 50 min | 0 | 1 | 1.5 | 1.5 | 1.5 | 1.75 |
| 60 min | 0 | 1.5 | 1.5 | 1.5 | 1.75 | 2 |

[1] A.U. or N.F.U.
[2] Pancreatic enzyme concentrate (Chymotrypsin:Trypsin, approx. 1:5) at 600 A.U./mg.
[3] Chymotrypsin N.F., at 1,055 N.F.U./mg.
[4] Trypsin N.F. at 3,280 N.F.U./mg.

EXAMPLE II

Silicone foam (Dow's SILASTIC RTV S-5370 Foam) is combined with a silicone foam catalyst and poured into molds previously coated with a mold release agent such as paraffin. The mold is closed with a polyethylene plate through which gas may escape as the foam expands to fill the mold and extend through the foraminae of the support plate which was placed into the mold immediately following the introduction of the silicone reagents.

The foam plate assembly thus prepared is ready for further treatment.

EXAMPLE III

A foam plate assembly, prepared according to example II, is impregnated with enzyme, such as a mixture of chymotrypsin and trypsin in a ratio of about 1:5, by dissolving the enzymes in water to form a solution. The foam plate is then placed in a vessel, stainless steel is suitable, and submerged in the enzyme solution. A vacuum is created in the vessel. Upon return of the vessel to atmospheric pressure, the solution is absorbed into the foam. The impregnated pledgets are then frozen in stainless steel pans and dried under vacuum.

EXAMPLE IV

A device is assembled by attaching a pledget, prepared according to example III, to a handle member by a coupling member which may be formed of medical-grade silicone tubing.

EXAMPLE V

The procedures of examples III and IV were repeated using an enzyme solution containing chymotrypsin to provide a potency of 5000 N.F.U. per pledget.

EXAMPLE VI

The procedures of examples III and IV were repeated using an enzyme solution containing a mixture of chymotrypsin and trypsin (1:5) to provide a potency of 500 A.U. per pledget.

EXAMPLE VII

The procedures of examples III and IV were repeated using an enzyme solution containing a mixture of chymotrypsin and trypsin (1:5) to provide a potency of 1000 A.U. per pledget.

EXAMPLE VIII

The procedures of examples III and IV were repeated using an enzyme solution containing a mixture of chymotrypsin and trypsin (1:5) to provide a potency of 5000 A.U. per pledget.

EXAMPLE IX

Devices prepared according to example VII were used to obtain Papanicolaou smears from patients who were also sampled by a combined scrape-aspirator or cotton swab technique. Cells on slides prepared from the samples taken using the device of this invention were visually superior to those obtained by the old techniques as adjudged by their stainability, clarity, quantity, and substantial freedom from obscuring mucus. Further, instances of false negative results obtained by the old techniques were detected using our device.

From the foregoing, it becomes apparent that a new and useful diagnostic device has been herein described and illustrated which provides remarkably unexpected benefits especially in obtaining cytologic samples as in those gynecologic procedures requiring cervical and endocervical cellular specimens. It is, or course, understood that modifications, alterations and adaptions can be made by the artisan confronted with this disclosure without departing from the spirit hereof, especially as it is defined by the scope of the claims appended hereto.

What is claimed:

1. A diagnostic device for obtaining cytologic specimens from a body orifice of a patient comprising: an elongated handle member; a support member disposed at one end of said handle member; and a pledget disposed upon said support member and carried thereby, said pledget having a body portion and on outwardly extending nose portion, each of said portions presenting a separate body-engaging surface, said pledget being impregnated with an amount of proteolytic enzyme which, by fibrin plate assay, produces a zone of lysis of not less than 1.0 mm. in not more than 20 minutes.

2. A device according to claim 1 in which said proteolytic enzyme is selected from the group consisting of trypsin, chymotrypsin and mixtures thereof.

3. A device according to claim 2 in which said enzyme is lyophilized.

4. A device according to claim 1 in which said handle member and said support member are joined by coupling means operatively interposed therebetween said means providing lateral movement of said support member thereabout while restricting longitudinal and helical movement thereof.

5. A device according to claim 4 in which said support member comprises a foraminous plate having a first stem extending upwardly therefrom and a second stem extending downwardly therefrom.

6. A device according to claim 5 in which an elastic foam pledget is formed around said first stem and upon said foraminous plate and extends through said plate to retain said pledget stationary relative thereto.

7. A device according to claim 6 in which said foam envelops said first stem to define an endocervical entering tip therewith.

8. A device according to claim 4 in which said handle member comprises an elongated body portion and an extending stem portion, said stem portion and said coupling member being telescopically insertable relative to each other.

9. A device according to claim 1 in which said amount of proteolytic enzyme produces, by fibrin plate assay, a zone of lysis of not less than 5.0 mm. in not more than 60 minutes.

10. A device according to claim 1 in which said enzyme comprises a mixture of trypsin and chymotrypsin, the ratio of chymotrypsin to trypsin in said mixture being about 1:5.

* * * * *